United States Patent [19]
Scott

[11] Patent Number: 5,953,658
[45] Date of Patent: Sep. 14, 1999

[54] SYSTEM AND METHOD FOR ELIMINATING OFFSET ECHO IN A DATA CONNECTION OVER A CELLULAR CORDLESS TELEPHONE SERVICE

[75] Inventor: Robert Earl Scott, Indian Rocks Beach, Fla.

[73] Assignee: Paradyne Corporation, Largo, Fla.

[21] Appl. No.: 08/780,763

[22] Filed: Jan. 8, 1997

[51] Int. Cl.$^6$ .................................................. H04Q 7/38
[52] U.S. Cl. ............................................................. 455/422
[58] Field of Search ................................... 455/422, 462, 455/501, 554; 379/406

[56] References Cited

U.S. PATENT DOCUMENTS

| | | |
|---|---|---|
| 4,697,281 | 9/1987 | O'Sullivan . |
| 4,989,230 | 1/1991 | Gillig et al. ............................... 379/59 |
| 5,007,047 | 4/1991 | Sridhar et al. . |
| 5,163,044 | 11/1992 | Golden . |
| 5,206,854 | 4/1993 | Betts et al. .............................. 372/32.1 |
| 5,214,637 | 5/1993 | Sridhar et al. . |
| 5,394,392 | 2/1995 | Scott . |
| 5,396,486 | 3/1995 | Scott . |
| 5,418,778 | 5/1995 | Cummiskey et al. . |
| 5,442,680 | 8/1995 | Schellinger et al. ....................... 379/58 |
| 5,450,438 | 9/1995 | Landry et al. ........................... 375/222 |
| 5,479,480 | 12/1995 | Scott . |
| 5,673,308 | 9/1997 | Akhavan . |

*Primary Examiner*—William Cumming
*Attorney, Agent, or Firm*—Thomas, Kayden, Horstemeyer & Risley, L.L.P.

[57] ABSTRACT

A system and method is discloded for training echo cancelers during a training sequence of a data connection between a first modem connected to a cellular cordless phone and a second modem, wherein the cellular cordless phone in operating a microcellular mode as opposed to a cellular mode. In such circumstances, where an intermittent two-wire channel interconnects the microcell base station and a central office associated with the public switched telephone network (PSTN), an offset echo will occur in the remote echo of the second modem and the local echo of the first modem. The offset echoes can be attributed to a radio frequency (RF) delay between the cellular cordless phone and the microcell base station. The first modem can make accommodations for the RF delay by increasing the delay time utilized in setting its near-end echo canceler. The second modem can be spoofed into setting its taps for its far-end echo canceler accuratly, despite the RF delay the first modem, by reducing its preset delay when responding to the ranging signal of the second modem. Thus, in accordance with the features of the invention, only the first modem need be configured to overcome offset echo.

5 Claims, 4 Drawing Sheets

SYSTEM AND METHOD FOR ELIMINATING OFFSET ECHO IN A DATA CONNECTION OVER A CELLULAR CORDLESS TELEPHONE SERVICE

FIELD OF THE INVENTION

The present invention generally relates to data communications and, more particularly, to training the echo cancelers of two modems that are establishing a data communication link with a cellular cordless telephone that is operating in a microcellular mode.

BACKGROUND OF THE INVENTION

The popularity of both cordless telephones and cellular telephones has grown dramatically over the last decade. Cordless telephones are typically used in a home to allow a user to place and receive telephone calls at virtually any point throughout the house, or even into the yard. Such a cordless telephone system typically includes a portable cordless handset and a single cordless base station that is connected to the public switched telephone network (PSTN) by telephone land lines. An advantage to these cordless telephone systems is that they operate over the existing telephone land lines interconnecting the building or house where the cordless base station is located and the central office of the local exchange carrier, and thus, are billed as simple telephone lines in accordance with the customary land-line prices of the local exchange carrier. However, these cordless telephone systems operate with relatively low power, and therefore, have a limited coverage range.

Cellular telephones, on the other hand, operate over very large coverage areas that are divided into cells. Each cell is serviced by a cellular base station that is connected to the PSTN via a mobile switching center (MSC), as well known in the industry. Thus, the cellular customer is able to maintain a communication link as the customer travels from cell to cell without interruption using hand-off techniques. This provides an extreme amount of flexibility to the cellular customer, not to mention that the cellular customer can operate their cellular telephone over virtually any of the cellular networks maintained by cellular service providers. Presently, a substantially large portion of the United States is serviced by at least one cellular network, including essentially all metropolitan areas and most interstate highways. However, the cost of using the cellular telephone service is generally greater than that of the cordless telephone service. Most cellular service providers charge their customers a flat monthly rate plus an additional surcharge based on customer's usage.

As a solution, cellular cordless telephones have been developed which combine the portability and large coverage areas of a cellular telephone system with the convenience and low cost of a cordless telephone system in a single handset referred to hereafter as a cellular cordless telephone.

In essence, a cellular cordless telephone has two or more modes of operation. In a first mode, referred to herein as the ricrocellular mode, the cellular cordless telephone operates in conjunction with a microcell base station that is connected directly to the central office of a local exchange carrier. Thus, the microcellular mode can include a variety of different type telecommunication services that may be combined with cellular phone service in a single telephone handset other than a cordless telephone, such as a is personal communication system (PCS). Generally, the microcellular mode is characterized by a relatively small coverage area serviced by a microcell base station that is connected to the central office of the local exchange carrier, i.e., the PSTN, via an intermediate two-wire connection. This two wire connection may, for instance, connect the microcell base station directly to the central office or it may connect the microcell base station to a wireless switch or corporate private branch exchange (PBX) within a building which is subsequently connected to the PSTN.

In the second mode, referred to herein as the cellular mode, the cordless cellular telephone operates in conjunction with cellular base stations that are connected to a mobile switching center (MSC) that is connected to the PSTN. Accordingly, the cordless cellular telephone in this mode operates as a traditional cellular telephone.

In operation, the cellular cordless telephone initializes in the microcellular mode to determine if it is within range of the microcell base station in order to take advantage of the lower cost land-line services such as cordless or PCS. If the cellular cordless telephone is not within range of the microcell base station, it switches to cellular mode, wherein it registers with the local cellular service provider as a cellular telephone. The cellular cordless telephone may also be provided with manual controls enabling the user to override the microcellular mode so as to operate the phone in a cellular mode from initialization. An example of a cellular cordless telephone can be found in U.S. Pat. No. 5,442,680 to Schellinger, et al., the disclosure of which is incorporated herein by reference.

With the popularity and use of cellular cordless telephones coming of age, it has been determined that the cellular telephone user who now uses a cellular cordless telephone in order to reduce cost will not receive the reliability and speed in data communications when operating in the microcellular mode. Particularly, the user of cellular cordless telephone services are more and more combining the functionality of portable data terminal equipment (DTE), e.g., the laptop computer or personal digital system, with cellular data communication equipment (DCE), e.g., a modem coupled to a cellular cordless telephone, in order to service their professional and personal needs. However, when a cellular cordless telephone is connected to a modem associated with a computer for establishing a data communication link with a remotely located modem associated with another computer, the user is unable to obtain the same speed and reliability when operating the cellular cordless telephone in the microcellular mode as opposed to connecting the modem directly to a wall jack provided by the local exchange carrier as a part of the land-line network. In today's extremely competitive market place, the inability to provide users with data communications with the speed and reliability that they are accustomed dramatically reduces a products desirability. Currently, no modem known to the present inventor is able to adequately address the poor performance found when using a cellular cordless telephone in the microcellular mode.

Thus, a heretofore unaddressed need exists in the industry for enabling faster and more reliable data communications using a cellular cordless telephone operating in a microcellular mode.

SUMMARY OF THE INVENTIOIN

The present invention overcomes the inadequacies and deficiencies of the prior art as discussed hereinbefore and as well known in the industry. The present invention can be broadly thought of as a novel system and method for training echo cancelers during a training sequence of a data connection between a first modem that is connected to a cellular cordless telephone and a second modem, wherein the cellular cordless telephone is operating in a microcellular mode. For purposes of the present disclosure, a cellular cordless telephone comprises any combination of two or more wireless telephone service combined in a single handset whereby the telephone has multiple modes of operation, including one of which communicates through a microcell base station that is connected to a central office of a local exchange carrier, i.e., the PSTN, via an intermediate two-wire channel.

The present invention is made possible by the discovery that a radio frequency (RF) delay exists in a communication link between a cellular cordless phone and the microcell base station when operating in the microcellular mode. Particularly, when the cellular cordless telephone is connection to a first modem for establishing a data communication link with a second modem that is connected to the public switched telephone network (PSTN), and wherein both modems are echo canceling modems (e.g., International Telecommunications Union (CCITT) V 0.32bis or V 0.34 modulation standards), the tap settings for the far-end echo canceler of the second modem and the near-end echo canceler of the first modem are improperly set during the training sequence because of the RF delay. The improper setting of the taps for the far-end echo canceler of the second modem and the near-end echo canceler of the first modem creates an offset echo that is defined herein as an echo that is offset from its normal place at the termination of the connection. Consequently, the remote echo of the second modem and the local echo of the first modem are not adequately canceled causing the modems to transmit data at slower speeds and to be more susceptible to disconnect.

Accordingly, the present invention provides for a system and method for training echo cancelers during a training sequence of a data connection between a first modem connected to a cellular cordless telephone and a second modem connected to the PSTN so that when the cellular cordless telephone is operating in the microcellular mode, the offset echo is substantially eliminated. During the training sequence, each modem determines a round trip delay by performing an exchange of tones in the training sequence referred to as ranging. The round trip delay is then used to set the taps for the far-end echo cancelers to remove the remote echo from the received signal, as is well know in the industry. In this exchange of tones, the second modem receives a ranging signal from the first modem. Upon receiving the ranging signal from the first modem, the second modem waits a predetermined delay which is set forth in the modulation standard utilized by the two modems before responding with a return signal to the first modem. As an example, with ITU (CCITT) V 0.34 modulation standard, the predetermined delay is 40 milliseconds (ms). By knowing the lapsed time between the transmission of the ranging signal and the receipt of the return signal, the second modem can determine the round trip delay by subtracting the predetermined delay from the lapsed time.

However, in accordance with the present invention, this predetermined delay at the first modem is shortened to 30 ms (under V 0.34 modulation standard) to accommodate for the RF delay which can generally be approximated as 10 ms, that is, 5 ms each way. The second modem will then determine the appropriate setting for the taps of its far-end echo canceler as it normally would by subtracting 40 ms in accordance with ITU (CCITT) V 0.34 modulation standard from the lapsed time between sending the ranging signal and receiving the return signal, thereby eliminating the 10 ms RF delay. Thus, the first modem has essentially "spoofed" the second modem into setting its taps to eliminate the offset echo.

In a similar fashion and in accordance with the present invention, since the first modem knows that it is connected to the cellular cordless telephone and that the telephone is operating in the mirocellular mode, the first modem will automatically take into account the 10 ms RF delay when setting the taps for its near-end echo canceler so as to remove the local echo from its received signal.

Hence, the present invention need only be incorporated into the first modem that is associated with the cellular cordless telephone in order to remove offset echo caused by the RF delay, without any modification to the second modem. Specifically, the operating code of the first modem can be configured with the present invention to control the digital signal processor (DSP) of the first modem when performing the training sequence so as to operate in accordance with the teachings herein. This includes shortening the predetermined delay set in the modulation standard when determining the round trip delay for the second modems far-end echo canceler and lengthening the delay set by the modulation standard when setting the taps of the near-end echo canceler of the first modem.

In accordance with a feature of the present invention, higher speed connections and better reliability are attained over the data connection by removal of the opposite echo in accordance with the present invention.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The present invention can be better understood with reference to the following drawings. The elements of the drawings are not necessarily to scale, emphasis is instead being placed upon clearly illustrating the principals of the present invention. Furthermore, like reference numerals represent like parts throughout the several views.

DETAILED DESCRIPTION OF THE PREFERRED EMBODIMENT

The following description is of the best presently contemplated mode of carrying out the present invention. This description is not to be taken in a limiting sense, but is made merely for the purpose of describing the general principles of the invention. The present invention is disclosed below in the context of two echo canceling modems operating in accordance with the International Telecommunications Union (ITU) (CCITT) V 0.34 modulation standard. However, as can be appreciated by one of ordinary skill in the art, the present invention is equally applicable with other modulation platforms which perform echo cancellation, such as ITU (CCITT) V 0.32bis. Thus, the present description is not to be taken in a limiting sense, but is made merely for the purpose of describing the general principles of the invention. The scope of the invention should be determined by referencing the appended claims.

Figure 1:
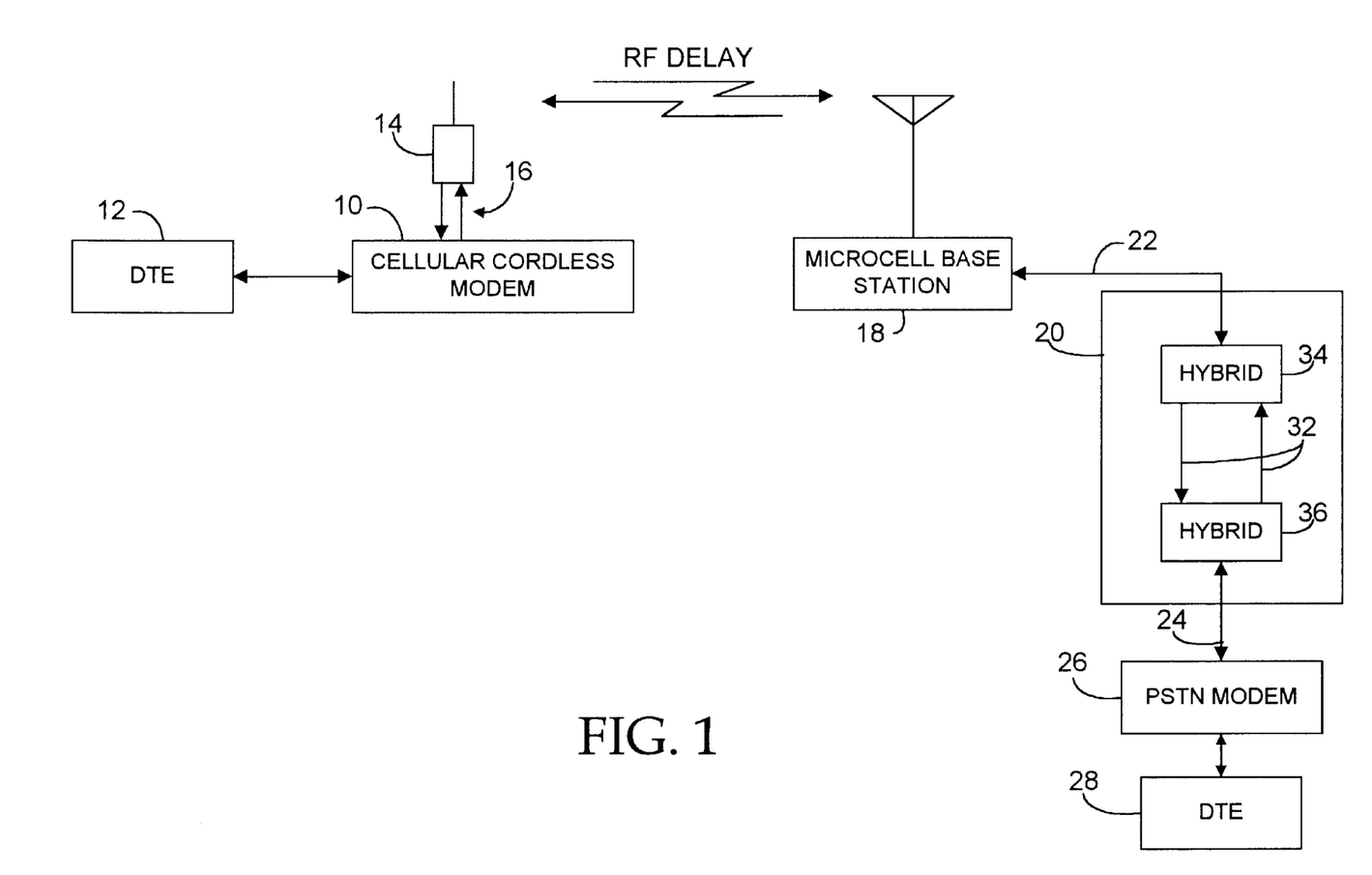
FIG. 1 is a block diagram of a cellular cordless data communication system, wherein the microcell base station is connected directly to the public switched telephone network (PSTN)
Figure 2:
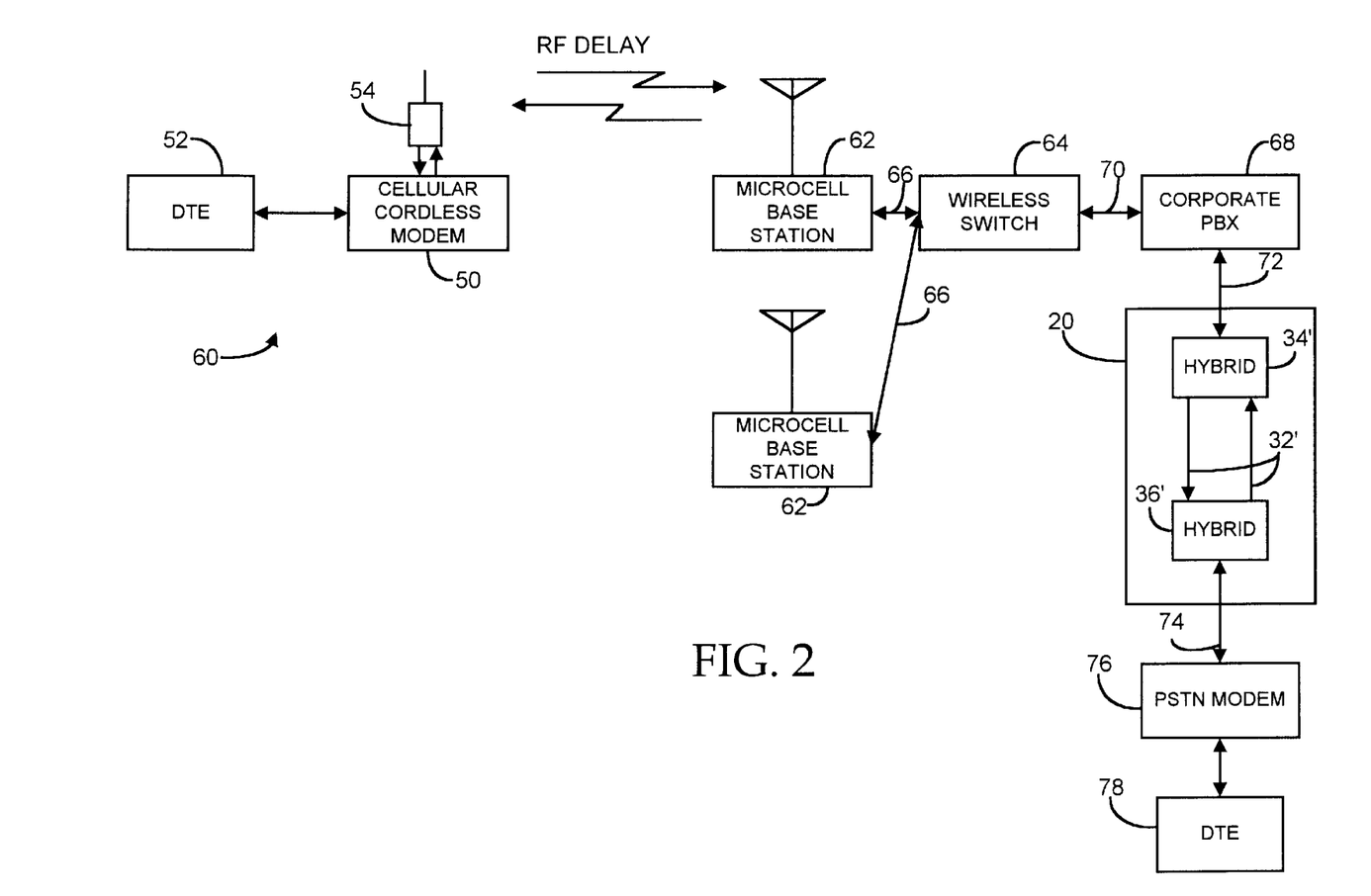
FIG. 2 is a block diagram of a cellular cordless data communication system, wherein the microcell base station is connected to the PSTN via a wireless switch and incorporate PBX.

With reference now to the drawings, generally illustrated in FIGS. 1 and 2 are two illustrative examples of a cellular cordless data communication system operating in the microcellular mode. In particular reference to FIG. 1, a cellular cordless modem 10 couples a data terminal equipment (DTE) 12, such a laptop or desktop personal computer, to a cellular cordless telephone 14 through a direct connect adapter 16. Thus, the cellular cordless modem 10 can modulate the data signal from the DTE 12 to a quadrature amplitude modulated (QAM) signal in most cases, as well known in the industry. The cordless cellular phone 14 then modulates the cellular cordless modem's 10 QAM signal onto the radio frequency (RF) carrier which is transmitted to a microcell base station 18.

The microcell base station 18 demodulates the RF carrier and transmits the received version of the QAM signal to the public switched telephone network (PSTN) 20 via a bidirectional two-wire link 22. The QAM signal passes through the PSTN 20 where it is directed to a far end data point over another bidirectional two-wire link 24 which is connected to a PSTN modem 26. The PSTN modem 26 demodulates the QAM signal into the original data signal which is passed on to a DTE 28, such as a laptop or desktop personal computer.

At the PSTN 20, links 22 and 24 are interconnected by unidirectional transmission paths 32 through hybrids 34, 36. It is noted at this point that the two-wire links 22 and 24 are physical pairs of wires which carry information in both directions of transmission simultaneously. The unidirectional links 32 may or may not be physical wire pairs, but indicates what is commonly referred to as a four-wire path, which is, in essence, dual two-wire links wherein each link is dedicated to one direction of transmission. In this configuration, which is well known in the art, the hybrids 34, 36 perform four-wire to two-wire conversion so as to split and combine the signals for each direction of transmission at the junction between the two-wire links 22, 24 in the four-wire links 32.

As a result of the four-wire to two-wire conversion performed by hybrids 34 and 36, a portion of the signal energy from each direction of transmission leaks through to the opposite direction path. This cross-path leakage places some of the transmitted signal in with the receipt signal causing what is referred to as echoing. An echo signal is undesirable because it degrades the modem receiver's performance, and thereby reducing the modem's transmission speed and reliability.

Thus, each modem 10, 26 experiences what is referred to as a local echo and a remote echo. With reference to cellular cordless mode 10, a local echo is caused by a transmit signal over link 22 which crosses over onto the receive signal on link 22 at hybrid 34, and a remote echo is caused by transmit signal on one of links 32 carrying the transmit signal that crosses over onto the other link 32 carrying the receive signal at hybrid 36. Alternatively, with reference to PSTN mode 26, a local echo is caused by a transmit signal over link 24 which links on to the receive signal on link 24 at hybrid 36, and a remote echo is caused by a transmit signal on one of links 32 carrying the transmit signal that links onto the other link 32 carrying the receive signal at hybrid 34.

In an effort to mitigate the effect of both local and remote echoes, most modems now include both a near-end echo canceler 40 (FIG. 3) to minimize the effects of a local echo and a far-end echo canceler 42 (FIG. 3) to minimize the effect of the remote echo. In essence, both the near-end and the far-end echo cancelers 40, 42 synthesize a replica of their respective echoes which is then subtracted from the received signal at a point in time in which the echo is expected to be received by the modem. In order to know when to subtract the synthesized replica of the remote echo from the received signal, the modems perform a process called ranging during their training sequence whereby the round trip delay is measured. This round trip delay is then used by the far-end echo canceler to determine when the synthesized replica of the echoes to be subtracted from the received signal. For the near-end echo, ranging is normally not needed as the echo is assumed to be essentially at a zero time delay.

An important concept to understanding in the ranging process is that while the remote echoes are caused by the hybrids 34, 36 located on the far end of the PSTN with respect to the transmitting modem, the settings for the taps of the far-end echo cancelers are set based upon the round trip delay which correlates with the distance between modem 10 and modem 26, and not the distance between the transmitting modem and the hybrid causing the remote echo. This is because, in the case of the remote echo of the PSTN modem 26, the distances between the hybrid 34 and the modem 10 is typically so small in comparison to the distances between PSTN modem 26 and the hybrid 34, that the distance is nonconsequential in the round trip delay However, it has been determined by the present inventor that a radio frequency (RF) delay exists in the RF link between the cellular cordless phone 14 and the microcell base station 18. It is presumed that the RF delay is a result of processing in the RF link. Through empirical study, it has been determined that this delay is approximately 5 milliseconds (ms) in each direction, or 10 ms round-trip. Consequently, the far-end echo canceler of the PSTN modem 26 which believes that the remote echo is generated at approximately the location of the cellular cordless modem 10 will set its far-end echo canceler taps improperly because the remote echo caused by hybrid 34 is actually 10 ms closer in the round trip than the cellular cordless modem 10 because of the RF delay. This misplaced echo is referred to as an offset echo. Further, the taps of the near-end echo canceler of the cellular cordless modem 10 will be improperly set because the cellular cordless modem 10 believes that the local echo caused by the hybrid 34 is 10 ms closer than it actually is because of the RF delay. Unfortunately, no modem known to the inventor recognizes this problem, much less addresses it in any manner.

Another example of a cellular cordless communication system that is subject to offset echo is provided in FIG. 2, whereby the cordless cellular telephone may, for instance, be a personal communication service (PCS) telephone operating in a microcellular mode within an office building that is supported by several PCS cells. Particularly, a cellular cordless modem 50 couples a DTE 52 to a cellular cordless telephone 54. Thus, the cellular cordless modem 50 modulates the data signal from the DTE 52 to a quadrature amplitude modulated (QAM) signal that is then modulated onto the radio frequency (RF) carrier by the cellular cordless telephone 54 which is transmitted to one of the microcell base stations 62 within the office building. Each of the microcell base stations 62 is connected to a wireless switch 64 via a two-wire link 66 that is typically connected to a corporate private branch exchange (PBX) 68 via a two-wire link 70. Next, the corporate PBX 68 is connected to the PSTN 20 via a two-wire link 72. The QAM signal passes through the PSTN 20 where it is directed to a far end data point over another two-wire link 74 which is connected to the PSTN modem 76. The PSTN modem 76 demodulates the QAM signal into the original data signal which is then passed on to a DTE 78.

At the PSTN 20, links 72 and 74 are interconnected by unidirectional transmission paths 32' through hybrids 34' and 36'. In this configuration, as described above, the hybrids 34', 36' perform four-wire to two-wire conversion so as to split and combine the signals for each direction of transmission at the junction between the two-wire links 72, 74 in the four-wire links 32'. Note that the configuration and operation of the cellular cordless communication networks of FIGS. 1 and 2 are substantially similar with the exception that the microcell base stations 62 are interconnected with the PSTN 20 through the wireless switch 64 and the corporate PBX 68 via one or more two-wire links 66, 70, 72. As with the configuration described in FIG. 1, the RF link between the cellular cordless telephone 54 and the microcell base station 62 causes an offset echo that reduces the speed and reliability of the data communication link established between the modems 50 and 76. In general, the present invention has practical application in any mode where a 4-wire RF link separates a wireless modem from an "intermediate" 2-wire line, as described with reference to FIGS. 1 and 2.

Accordingly, in order to overcome the problems associated with offset echo, the present inventor has invented a novel system and method for performing ranging between the cellular cordless modem 10, 54 and the PSTN modem 26, 76, receptively, when operating in the microcellular mode. The present invention essentially "spoofs" the near-end echo canceler of the cellular cordless modem 10, 54 and the far-end echo canceler of the PSTN modem 26, 76 into compensating for the RF delay described above. A feature of the present invention is that it can be embodied in computer program code comprising executable (i.e., computer-readable) instructions encoded on a computer memory device associated with the cellular cordless modem 10, 50 so as to cause the cellular cordless modem 10, 50 to function in the manner described below.

Figure 3:
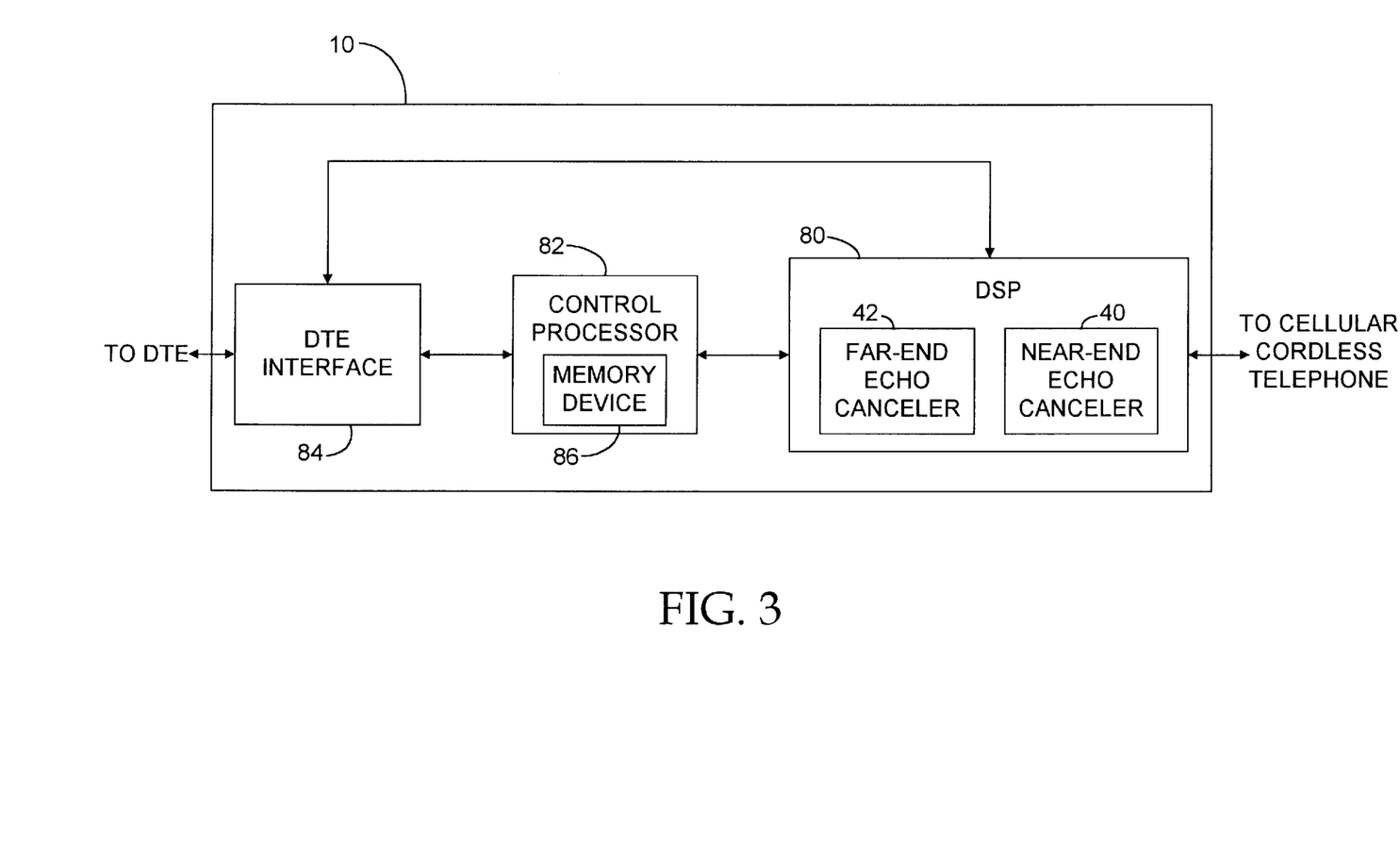
FIG. 3 is a block diagram of the cellular cordless modem of FIGS. 1 and 2.

In this regard, FIG. 3 illustrates the components of the cellular cordless modem 10, though it is noted that cellular cordless modem 50 includes substantially the same components and operates in substantially the same manner. Thus, the present invention will hereafter be described with reference to the cellular cordless modem 10 of FIG. 1 with the understanding that the teachings presented herein are equally applicable to the cellular cordless modem 50 of FIG. 2 for eliminating offset echo, as would be obvious to one of ordinary skill in the art. Referring to FIG. 3, the cellular cordless modem 10 comprises a digital signal processor (DSP) 80, a control processor 82, and a DTE interface 84. The DTE interface 84 of the cellular cordless modem 10 interfaces with the DTE 12 in order to communicate data signals back and forth between the DTE 12 and the cellular cordless modem 10. This connection may be implemented by any suitable interconnecting device such as, but not limited to, an electronic industry association (EIA) standard RS-232 connector. The control processor 82 essentially controls the operation of the cellular cordless modem 10 by executing the program data and operating code stored on a memory device 86 typically integrated therewith. However, a separate memory device (not shown) comprising read only memory (ROM) or random access memory (RAM) may be provided and connected to the control processor 82 for storing the operating code and/or program data, as well known in the art. In the context of this disclosure, a computer memory device is an electronic, magnetic, optimum, or other physical device or means that can contain or store computer program code for use by or in connection with a computer related system or method. The operating code stored in the memory device 86 includes control logic that controls, among other things, the operation of the DSP 80 during the training sequence so as to operate in accordance with the present invention as set forth below. The particular operating code for implementing the present invention is well within the ability of one with ordinary skill in the art upon reading of the present disclosure.

The DSP 80 provides the modulation functionality to the cellular cordless modem 10, including encoding/decoding and echo cancellation via a near-end echo canceler 40 and a far-end echo canceler 42. As described above, the near-end echo canceler 40 and far-end echo canceler 42 have taps that are set in the training sequence based on the round trip delay to cancel the local and remote echoes generated by the hybrids 34, 36, respectively. The cellular cordless modem 10 is further connected to the cellular cordless telephone 14 via a four-wire audio connection, well known by those skilled in the art as a direct connect cable.

Figure 4A:
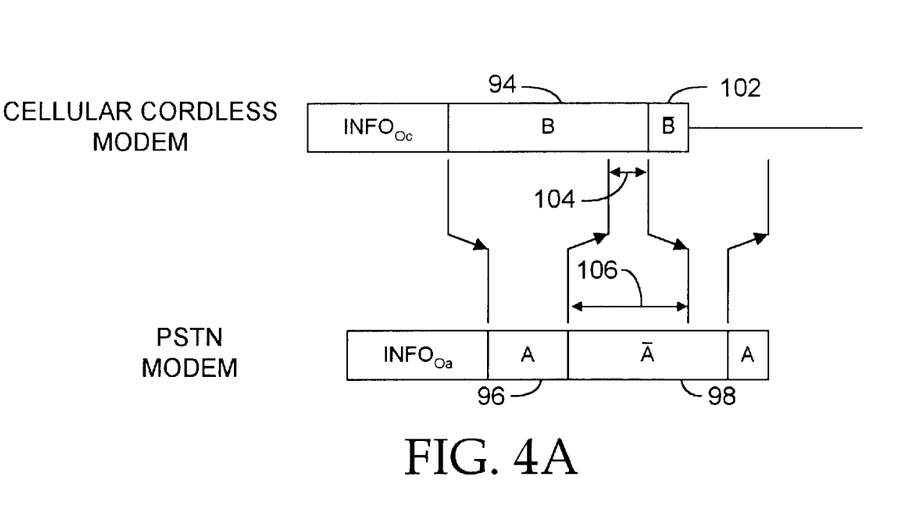
FIGS. 4A and 4B are a timing diagrams of training sequences performed in training the echo cancelers of a cellular cordless modem and a PSTN modem in accordance with the present invention.
Figure 4B:
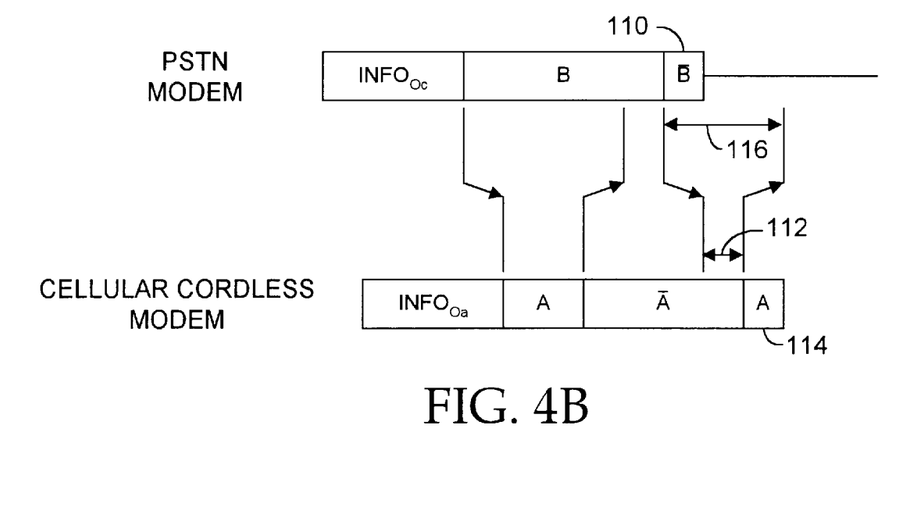

With reference now to FIGS. 4A and 4B, provided are timing diagrams illustrating ranging processes of the present invention as performed in accordance with the ITU (CCITT) V 0.34 modulation standard. However, it is noted that the present invention can be used in conjunction with other suitable modulations that performs echo canceling in order to compensate for the presence of off-set echo. As background, a ranging process typically consists of the calling modem receiving a ranging signal from the answer modem and waiting for a predetermined delay before sending a return signal to the answer modem. By measuring the lapsed time from the when the answer modem sends the ranging signal to when it receives the return signal, the answer modem can determine a round trip delay by subtracting the predetermined delay from the lapsed time. Because both modems initially determine that they are operating under ITU (CCITT) V 0.34 modulation at the beginning of their training sequence, the answer modem knows the length of the predetermined delay. Based upon the round trip delay determined by the answering modem, the answering modem sets the taps for its remote far-end echo canceler. Similarly, the same process occurs with the calling modem sending out a ranging signal and waiting for a return signal in order to determine a round trip echo delay for setting its taps.

Now, with reference to FIG. 4A, the ranging sequence of the present invention is provided wherein the cellular cordless modem 10 is the calling modem and the PSTN modem 26 is the answering modem. Thus, the cellular cordless modem 10 includes in its memory device 86 operating code for implementing the present invention, whereas the PSTN modem 26 is operating as a standard modem.

Initially, the cellular cordless modem 10 sends a tone B signal 94 to the PSTN modem 26 which the PSTN modem 26 responds to by sending a tone A signal 96 for a predetermined time followed by a tone A phase reversal signal 98. Upon detecting the tone A phase reversal signal 98, the cellular cordless modem 10 transmits a tone B phase reversal signal 102 after a predetermined delay 104. In the ITU (CCITT) V 0.34 modulation standard, this predetermined delay is set at 40+/−1 ms so that both modems know what value to subtract from the lapsed time. However, since the RF delay has been empirically found to be approximately 5 ms in each direction, the predetermined delay 104 at the cellular cordless modem 10 is shortened to 30 ms so as to spoof the PSTN modem 26 into calculating a round-trip delay that more accurately approximates the distance to the hybrid 34. Once the PSTN modem 26 detects the tone B phase reversal signal, the PSTN modem 26 can calculate the round-trip delay by subtracting the 30 ms delay 104 from the time interval from when the tone A phase reversal signal was initially transmitted and when the tone B phase reversal signal was initially received, denoted by reference numeral 106. Therefore, the PSTN modem is spoofed by the cellular cordless modem 10 into compensating for the RF delay so as to eliminate any offset in the remote echo of the PSTN modem 26.

Similarly, if the cellular cordless modem 10 were the answering modem and the PSTN modem 26 were the calling modem, as illustrated in FIG. 4B, then the PSTN modem 26 can determine a round trip delay as follows. Upon receiving a tone B phase reversal signal 110, the cellular cordless modem 10 waits a predetermined delay 112 (30 ms in the preferred embodiment) and then sends a tone A signal 114 to the PSTN modem 10. Upon receiving the tone A signal 114, the PSTN modem 26 can determine the correct round trip delay for setting its far-end echo canceler taps by subtracting the predetermined delay 112 from the lapsed time interval between the sending of the tone B phase reversal 110 and the receipt of the tone A signal 114, denoted by reference numeral 116.

It should be noted at this point that the RF delay for future wireless systems may vary from the previous-mentioned 10 msec. Since the cellular modem 10 knows the type of wireless phone it is interfacing to and therefore, the wireless system it is operating on, the cellular modem 10 can make the adjustments to its timer and still be able to "spoof" the remote system into setting its remote echo taps to the proper values.

In concluding the detailed description it should be noted that it will be obvious to those skilled in the art that many variations and modifications and may be made to the preferred embodiment without substantially departing from the principals of the present invention. All such variations and modifications are intended to be included herein within the scope of the present invention, as set forth in the following claims. Further, in the claims hereafter the corresponding structures, materials, acts, and equivalents of all means or step plus function elements are intended to include any structures, material or acts for performing the function in combination with other claimed elements as specifically claimed.

Wherefore, the following is claimed:

1. A method for training echo cancelers during a training sequence of a data connection between a first modem that is connected to a cellular cordless telephone and a second modem, wherein said first and second modems are separated by an intermittent two-wire channel between a microcell base station associated with said cellular cordless phone and a central office, the method comprising the steps of:

receiving at said first modem a ranging signal from said second modem;

transmitting a return signal to said second modem in response to said ranging signal after a first time delay at said first modem that accounts for an offset from a radio frequency delay in said data connection;

training said echo canceler of said second modem with a round trip delay determined by subtracting a second time delay from a lapsed time between transmitting said ranging signal and receiving said return signal; and detecting microcellular mode of operation by said cellular cordless phone.

2. The method of claim 1, wherein said first time delay is less than said second time delay.

3. The method of claim 1, wherein said first time delay is approximately 10 milliseconds less than said second time delay.

4. The method of claim 1, further comprising the step of said first modem adjusting for the RF delay by including said offset in its own near-end echo canceller taps.

5. The method of claim 1, wherein said first modem is a cellular cordless modem, and said second modem is a PSTN modem.

* * * * *

UNITED STATES PATENT AND TRADEMARK OFFICE
CERTIFICATE OF CORRECTION

PATENT NO. : 5,953,658
DATED : September 14, 1999
INVENTOR(S) : Scott

It is certified that error appears in the above-identified patent and that said Letters Patent is hereby corrected as shown below:

Abstract, line 3, replace "modern" with --modem--.
    Abstract, line 3, replace "cordeless" with --cordless--.
    Abstract, line 4, delete "in".
    Abstract, line 5, before "operating" insert --is--.
    Abstract, line 5, after "operating" insert --in--.
    Abstract, line 17, replace "accuratly" with --accurately--.
    Abstract, line 17, after "delay" insert --by--.
    Col. 1, line 64, delete "is".
    Col. 4, line 18, replace "modems" with --modem's--.
    Col. 4, line 51, delete "a".
    Col. 5, line 13, after "such" insert --as--.
    Col. 7, line 33, replace "receptively" with --respectively--.
    Col. 9, line 12, after "modem" insert --26--.
    Col. 9, line 23, replace "10" with --26--.
    Col. 9, line 40, after "modifications" delete --and--.
    Col. 10, line 36, replace "the" with --a--.

Signed and Sealed this

Twenty-eighth Day of March, 2000

Attest:

Q. TODD DICKINSON

*Attesting Officer*     *Commissioner of Patents and Trademarks*